United States Patent [19]
McKewan

[11] Patent Number: 5,609,455
[45] Date of Patent: Mar. 11, 1997

[54] ANTICROSS-THREADING MALE FASTENER

[76] Inventor: Arthur J. McKewan, 798 Lakeside, Birmingham, Mich. 48009

[21] Appl. No.: 410,350

[22] Filed: Mar. 24, 1995

[51] Int. Cl.⁶ .................................................. F16B 25/00
[52] U.S. Cl. ............................ 411/386; 411/411; 411/417
[58] Field of Search ...................................... 411/386, 411, 411/417, 418, 423

[56] References Cited

U.S. PATENT DOCUMENTS

| Re. 28,907 | 7/1976 | Eibes | 411/417 |
|---|---|---|---|
| 4,534,690 | 8/1985 | Barth | 411/386 |
| 4,915,560 | 4/1990 | Peterson | 411/386 |
| 4,952,110 | 8/1990 | Avgoustis et al. | 411/386 |
| 4,973,209 | 11/1990 | Essom | 411/386 |
| 4,981,406 | 1/1991 | Weiss | 411/386 |
| 5,000,639 | 3/1991 | Hinkley | 411/386 |
| 5,122,132 | 6/1992 | Bremer | 411/386 |
| 5,209,622 | 5/1993 | Kazino | 411/386 |
| 5,304,022 | 4/1994 | Huska | 411/386 |
| 5,419,667 | 5/1995 | Augoustis | 411/386 |

Primary Examiner—Steven N. Meyers
Assistant Examiner—Gary Estremsky
Attorney, Agent, or Firm—Lyman L. Lyon, P.C.

[57] ABSTRACT

An externally threaded male fastener has a right circular cylinder at one end that is slidably engageable with the internal threads of a female element, a pair diametrically opposed circumferentially truncated approach thread portions between the right circular cylinder and its conventional threads, and a pair of diametrically opposed unthreaded portions between the approach thread portions that preclude cross-threading with an internally threaded female element.

4 Claims, 3 Drawing Sheets

ANTICROSS-THREADING MALE FASTENER

BACKGROUND OF THE INVENTION

The present invention relates generally to threaded fasteners and more particularly to a unique entrance end configuration for an externally threaded male fastener that precludes cross-threading with an internally threaded female element.

One problem that has existed since the advent of threaded fasteners is cross-threading of the external threads of a male fastener in the threads of an internally threaded female element. The possibility of cross-threading exists when the male fastener advances into the female element at an angle greater than twice the helix angle of the threads. Cross-threading often leads to seizing of the male fastener within the female element resulting in little or no clamp load on the joint.

SUMMARY OF THE INVENTION

The aforesaid problem is solved, in accordance with a preferred and constructed embodiment of the present invention, by providing the male fastener with a novel entrance end configuration, a modified approach thread form, and thread relief areas which function synergistically to control the approach angle of the male fastener relative to the female element and effect release of potentially crossed threads.

More specifically, the entrance end of an externally threaded male fastener comprises a right circular cylinder having a diameter substantially equal to the root diameter of the conventional threads of the fastener. A unique approach thread form is disposed between the cylindrical entrance end and the conventional threads of the male fastener. The crests of the intermediate threads are of normal cross section and helix angle but the crest diameter thereof gradually increase in diameter from the cylindrical end to the conventional threads of the male fastener in what may be termed a truncated conical array. Two arcuately spaced thread reliefs in the approach thread form, effect disengagement of potentially crossed threads upon each 180° rotation of the male fastener until the central axis of the male fastener is sufficiently aligned with the central axis of the female element to preclude cross-threading.

DETAILED DESCRIPTION OF THE PREFERRED EMBODIMENT(S)

Figure 1:
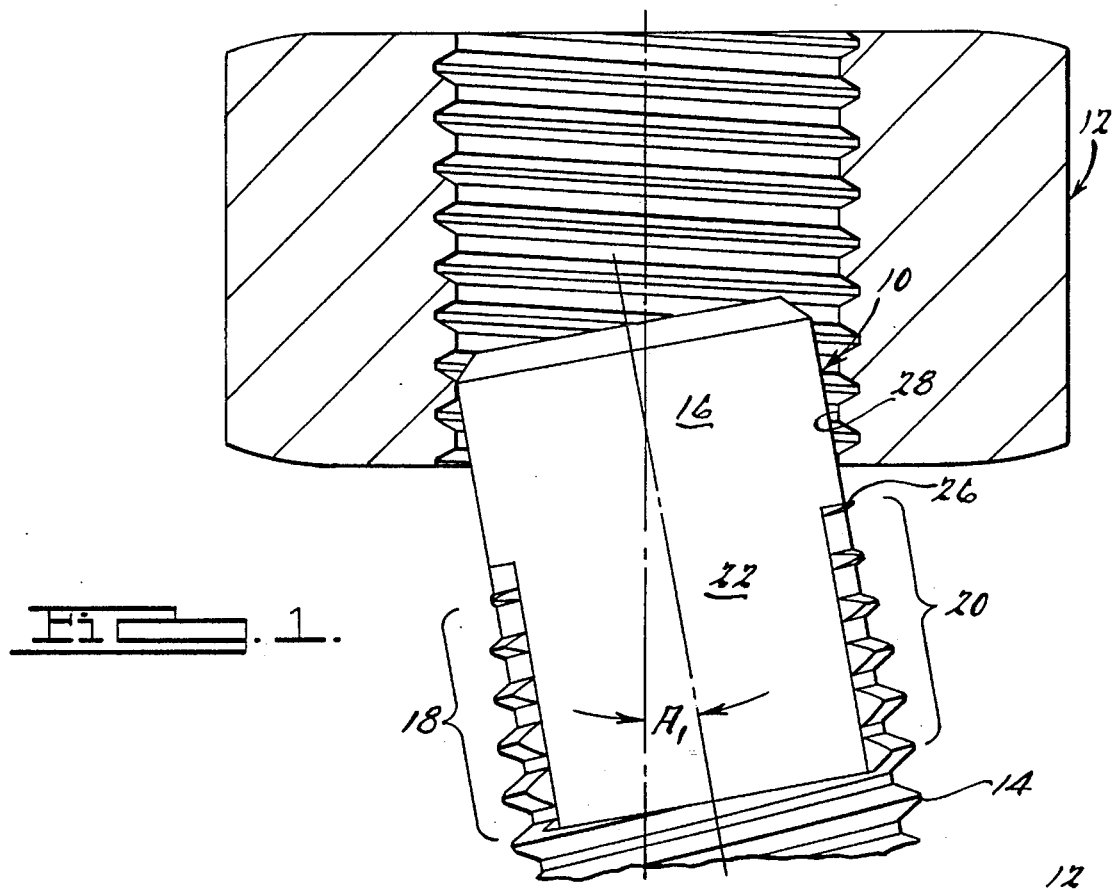
FIG. 1 is a cross-sectional view of an externally threaded male fastener approaching an internally threaded female element at an angle more than twice the helix angle of the thread, which raises the possibility of cross-threading.

As seen in FIG. 1 of the drawings, an externally threaded male fastener 10 is shown approaching an internally threaded female element 12 at a relatively large angle A1. The angle A1, is more than twice the helix angle B of the conventional threads 14 on the male fastener 10, setting the stage for possible cross-threading. However, in accordance with the present invention, the male fastener 10 is provided with a tip portion 16 that is threadless and of right circular cylindrical configuration. A pair of approach thread sections 18 and 20 are disposed between the tip portion 16 and conventional threads 14 of the fastener 10. The approach thread sections 18 and 20 are spaced 180° apart by unthreaded portions 22 and 24. The threads of the approach thread portions 18 and 20 of the male fastener 10 are of standard but truncated cross section and helix angle but the crests thereof are of gradually increasing crest diameter from the tip 16 towards the full threads 14 of the fastener 10 thereof. The approach thread portions 18 and 20 are spaced apart 180° and extend through arcs of approximately 60°. The unthreaded portions 22 and 24 are spaced apart 180° and extend through arcs of 120°.

Figure 2:
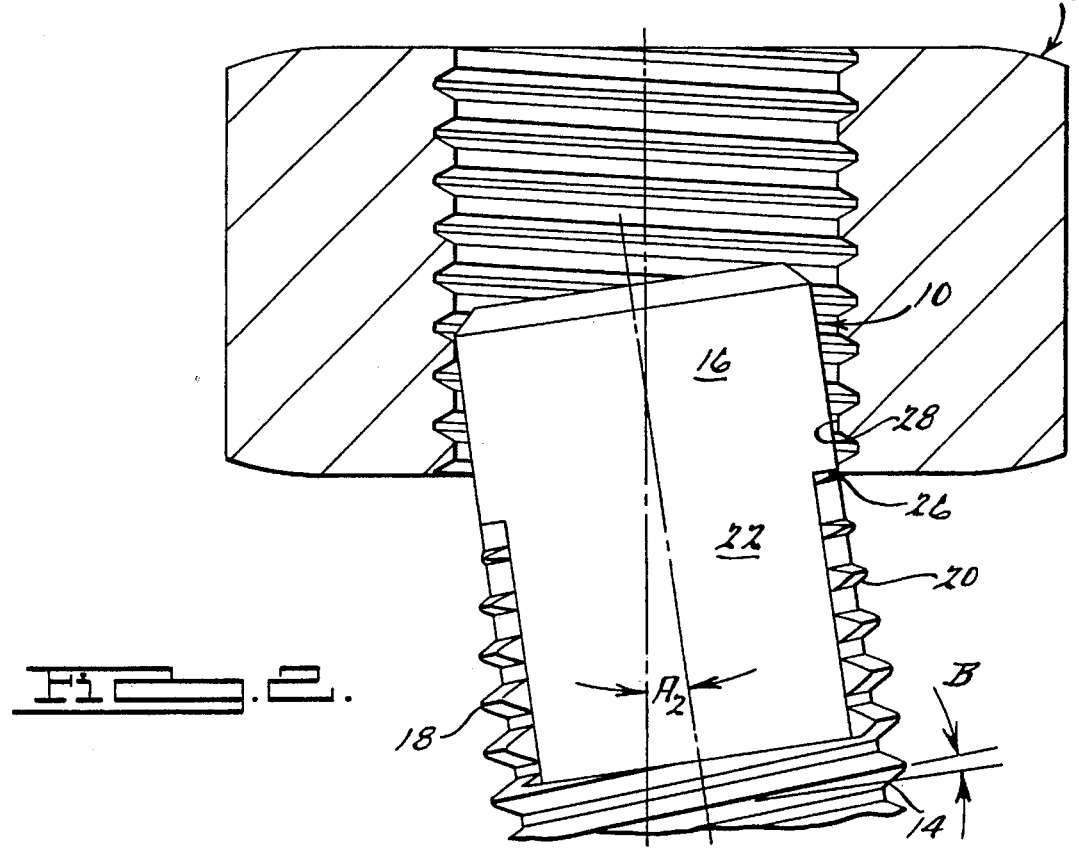
FIG. 2 is a view of the fastener of FIG. 1 at the point of engagement of the approach thread form with the internal threads of the female element.
Figure 4:
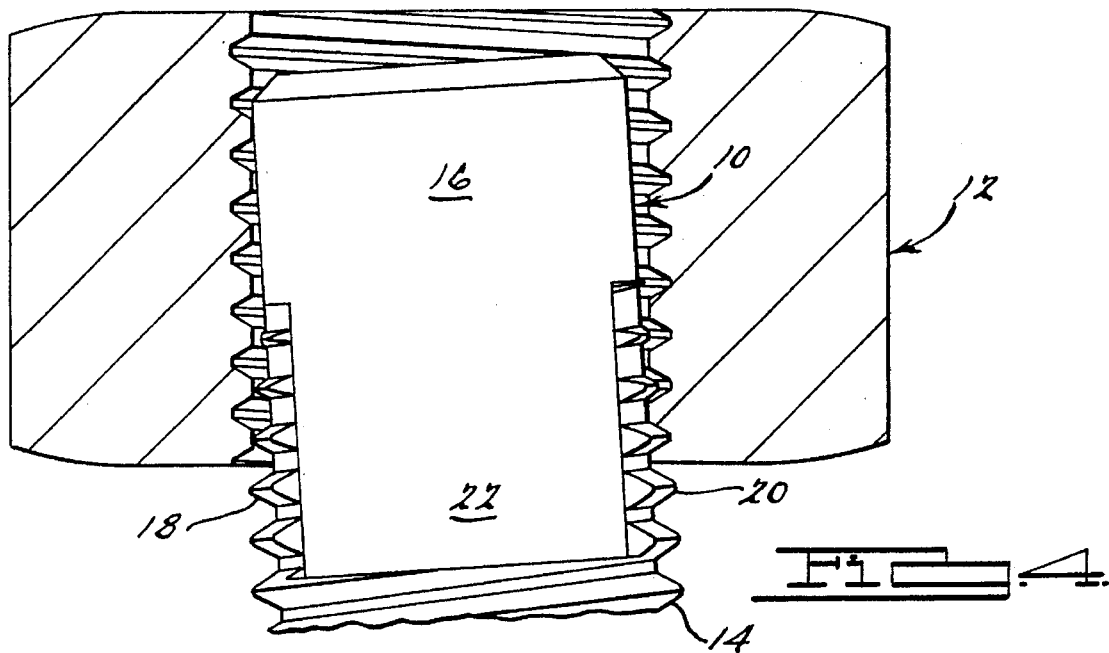
FIG. 4 is a view of the male fastener of FIG. 3 rotated 90°.

As seen in FIG. 2, the fastener 10 has advanced axially into the female element 12 to a position where a first thread 26 on the approach thread portion 20 engages an internal thread 28 of the female element 12. Because the approach angle A2 is still greater than twice the helix angle B, cross-threading is still a possibility.

Figure 3:
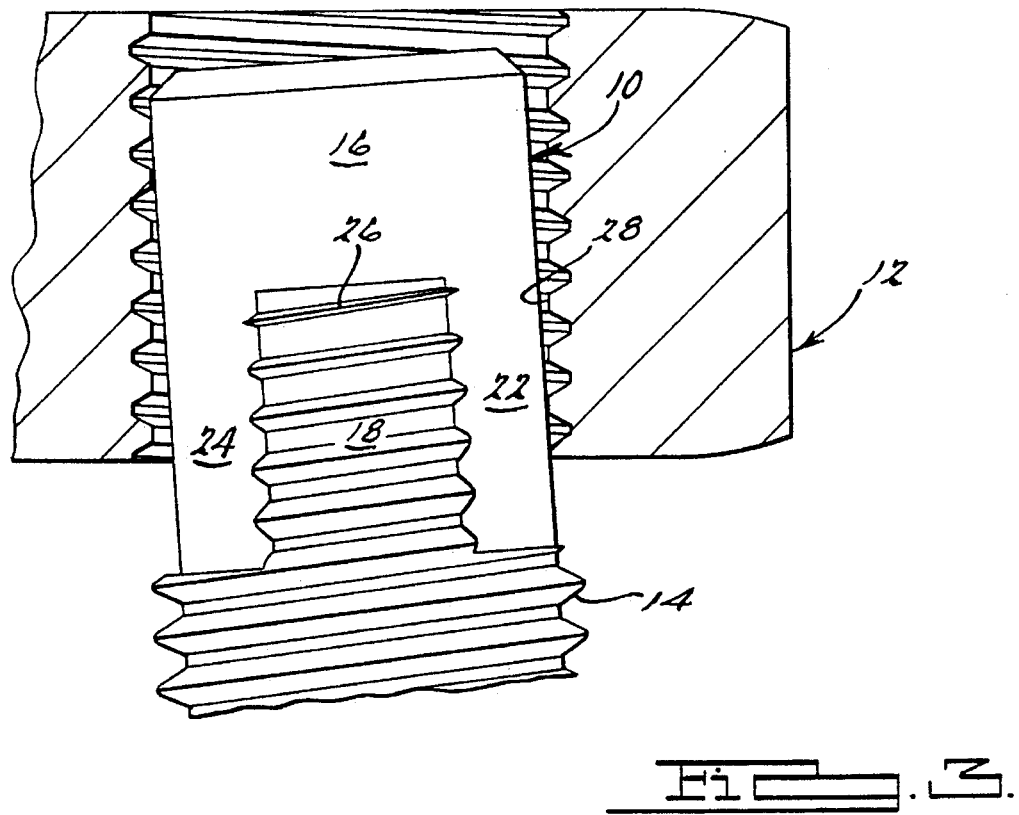
FIG. 3 is a view of the male fastener at a further stage of advancement and rotated 90° to show relief of potential cross-threading permitting further advancement of the male fastener.

However, as seen in FIG. 3 of the drawing, rotation of the male fastener 10 90° from the position shown in FIG. 2 of the drawings, frees the fist thread 26 from the first thread 28 of the female element 12 allowing further advancement of the male fastener 10 into the female element 12. Cross-threading is precluded by the aforesaid rotation of the male fastener 10 which effects intermittent disengagement of the threaded sections 18 and 20 from the threads 28 on the female element 12 at successive stages of advancement of the male fastener 10 until the approach angle thereof is reduced to an angle less than twice the helix angle of the threads 14 thereon, due to slidable engagement of the cylindrical end portion 16 of the male fastener 10 with the threads 14 of the female element 12. Stated in another manner, at two rotational positions in each 360° of rotation of the male fastener 10, the unthreaded portions 22 and 24 thereon disengage from the lowermost threads 28 of the female element 12 allowing further advancement of the male fastener 10 to a point that precludes cross-threading.

Figure 6:
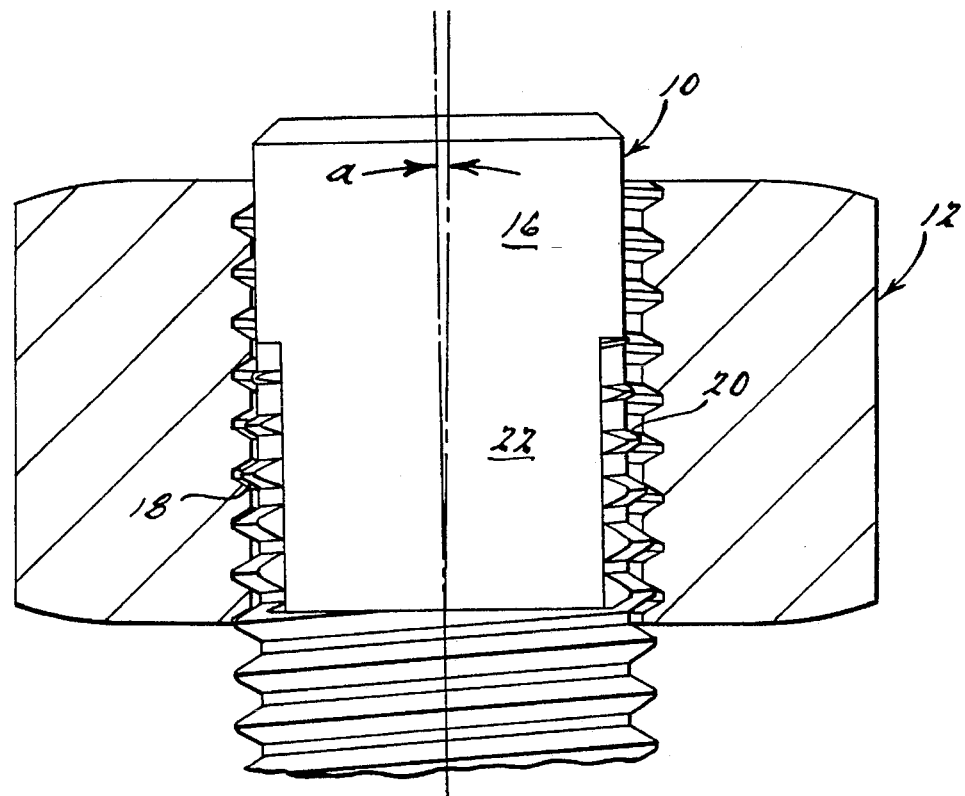
FIG. 6 is a view of the male fastener of FIG. 5 rotated 90°.
Figure 5:
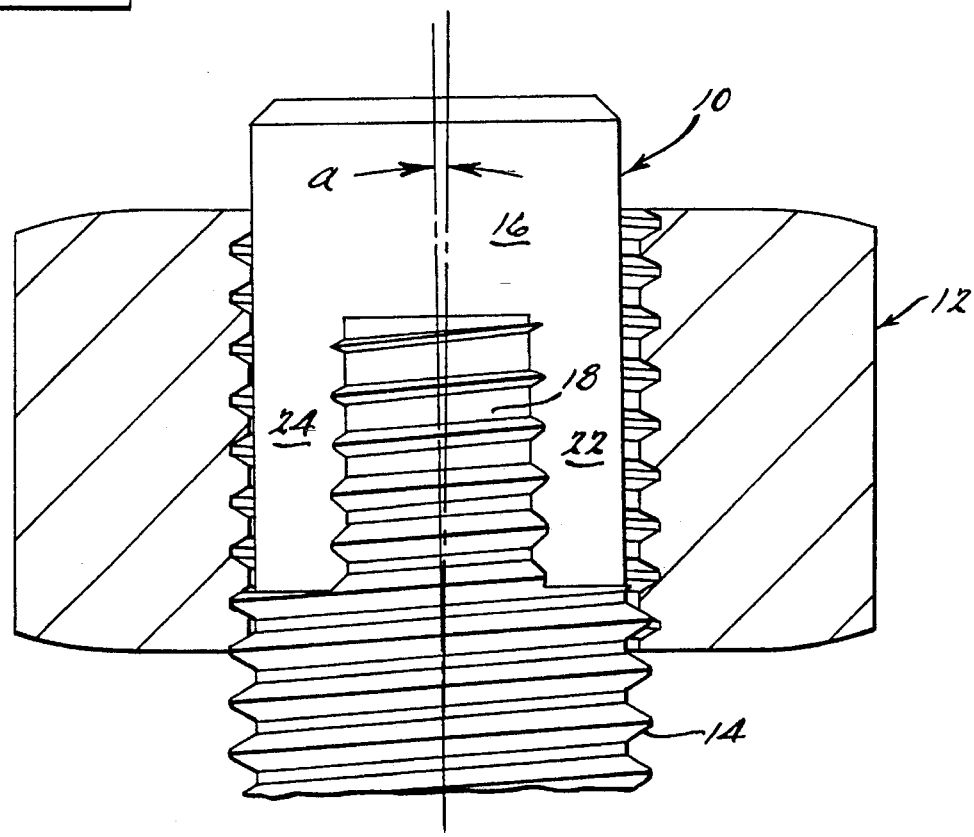
FIG. 5 is a view of the male fastener at the point of full thread engagement.

As seen in FIG. 5 and 6 of the drawings, the male fastener 10 is advanced to a point where the angle of misalignment between the central axis of the male fastener 10 and the central axis of the female element 12 is less than twice the helix angle B of the male fastener 10 whereupon the threaded portion 14 of the male fastener 10 is conditioned for proper engagement with the threads 28 of the female element 12.

While the preferred embodiment of the invention has been disclosed, it should be appreciated that the invention is susceptible of modification without departing from the scope of the following claims.

I claim:

1. An externally threaded male fastener having an entrance configuration that precludes cross-threading with an internally threaded female element, said male fastener comprising:

A first threaded portion at one end of said male fastener, said threads having a cross-sectional shape and helix angle;

A right circular cylindrical portion at the opposite end of said male fastener devoid of threads and having a diameter equal to the root diameter of the first threaded portion thereon so as to be slidably engageable with the internal threads of a female element upon insertion of said male fastener thereinto;

a pair of diametrically opposed circumferentially interrupted approach thread portions between the right circular cylindrical portion and the first threaded portion of said male fastener, said approach threads having the same helix angle and the same cross sectional shape at the crest as the first threaded portion but truncated at the root to have a reduced crest diameter, the crest diameter increasing from the cylindrical end portion toward the first threaded portion of said fastener in a truncated conical array; and a pair of diametrically opposed unthreaded portions between said approach thread portions, respectively, having a diameter equal to the right circular cylindrical portion of said fastener whereby initial engagement between the crest of one of said approach threads and the threads of the female element is released upon 90 degree rotation of said male fastener so as to permit advancement of the cylindrical portion of said male fastener towards alignment with a central axis of said female element.

2. A male fastener in accordance with claim 1 wherein the length of said right circular cylinder is sufficient to preclude permanent engagement of an approach thread on said male fastener with an internal thread of said female element when the central axis of said male fastener is related to the central axis of said female element at an angle greater than twice the helix angle of the threads on said male fastener.

3. A male fastener in accordance with claim 1 wherein said approach thread portions extend circumferentially through arcs, respectively, of substantially 60 degrees.

4. A male fastener in accordance with claim 1 wherein the diameter of the right circular cylinder at the one end thereof is substantially equal to the root diameter of the conventional thread thereon.

* * * * *